(12) United States Patent
Tybuszynski

(10) Patent No.: US 11,968,934 B2
(45) Date of Patent: Apr. 30, 2024

(54) LAWN TRIMMER ATTACHMENT FOR TRIMMING SPRINKLER HEADS

(71) Applicant: Edward Tybuszynski, Tequesta, FL (US)

(72) Inventor: Edward Tybuszynski, Tequesta, FL (US)

(*) Notice: Subject to any disclaimer, the term of this patent is extended or adjusted under 35 U.S.C. 154(b) by 630 days.

(21) Appl. No.: 17/175,608

(22) Filed: Feb. 12, 2021

(65) Prior Publication Data

US 2021/0251140 A1    Aug. 19, 2021

Related U.S. Application Data

(60) Provisional application No. 62/976,345, filed on Feb. 13, 2020.

(51) Int. Cl.
*A01G 3/06* (2006.01)
*A01D 34/84* (2006.01)
*A01D 34/416* (2006.01)

(52) U.S. Cl.
CPC ............ *A01G 3/06* (2013.01); *A01D 34/84* (2013.01); *A01D 34/416* (2013.01)

(58) Field of Classification Search
CPC . A01G 3/06; A01G 3/062; A01G 3/00; A01G 3/067; A01D 34/84; A01D 34/845; A01D 34/863; A01D 34/001; A01D 34/00; A01D 34/416; A01D 34/4165; A01D 34/4167; Y10S 30/07
See application file for complete search history.

(56) References Cited

U.S. PATENT DOCUMENTS

| | | | | |
|---|---|---|---|---|
| 2,295,072 A * | 9/1942 | Blessing | ............ | A01G 3/067 56/12.9 |
| 4,170,099 A * | 10/1979 | Owens | ............ | A01D 43/16 56/13.6 |
| 4,547,966 A * | 10/1985 | Eden | ............ | A01G 3/06 30/DIG. 7 |
| 4,827,702 A * | 5/1989 | Cerreta | ............ | A01D 34/416 56/13.4 |
| 4,852,260 A * | 8/1989 | Federico | ............ | A01G 3/062 30/292 |
| 5,461,788 A | 10/1995 | Taylor | | |
| 6,052,974 A * | 4/2000 | Harb | ............ | A01D 34/416 30/329 |
| 6,311,782 B1 | 11/2001 | Plasek et al. | | |
| 6,675,565 B2 * | 1/2004 | Appleyard | ............ | A01D 34/001 56/320.1 |

(Continued)

FOREIGN PATENT DOCUMENTS

GB       2281840 A *  3/1995  ............ A01D 34/001

*Primary Examiner* — Adam J Behrens
*Assistant Examiner* — Blake E Scoville
(74) *Attorney, Agent, or Firm* — Allen F. Bennett; Bennett Intellectual Property

(57) ABSTRACT

A lawn trimmer attachment for trimming sprinkler heads has sprinkler head clamps extending upward from its elongate body. Carriages for the sprinkler head clamps are biased by springs toward the center of the attachment. The bottom of the attachment has a plurality of longitudinally spaced blade sockets. Downwardly extending cutting blades may be inserted into the blade sockets to adjust the distance between the blades. A center brush extends downward between the cutting blades.

7 Claims, 9 Drawing Sheets

(56) References Cited

U.S. PATENT DOCUMENTS

| | | | |
|---|---|---|---|
| 6,857,480 B2* | 2/2005 | Thompson, Sr. | A01B 1/24 172/13 |
| 10,448,566 B2* | 10/2019 | Morabit | A01D 34/4165 |
| 2004/0188108 A1 | 9/2004 | Thompson, Sr. et al. | |
| 2008/0196254 A1* | 8/2008 | Bessinger | A01D 34/416 30/276 |

* cited by examiner

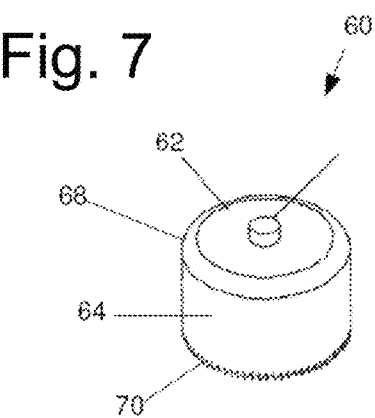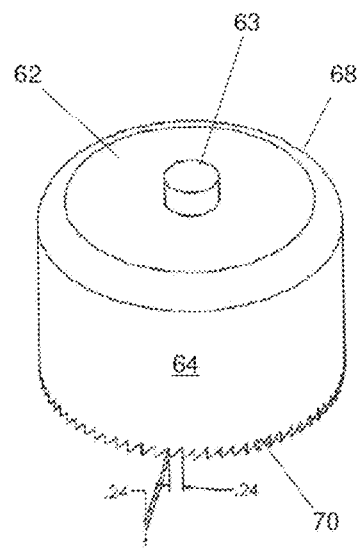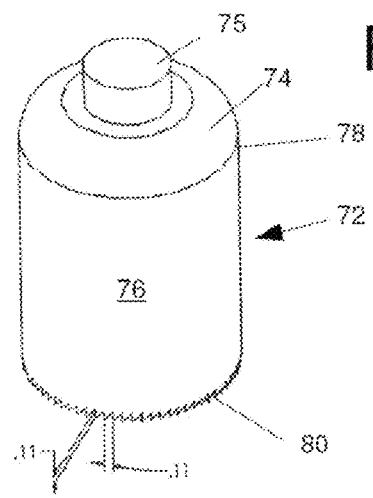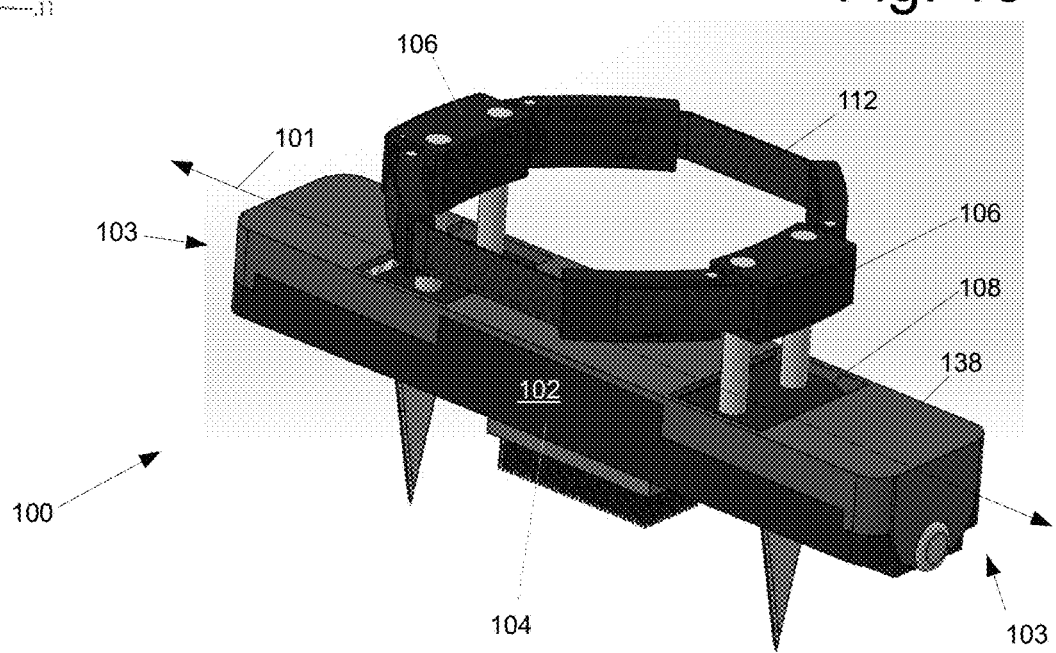

LAWN TRIMMER ATTACHMENT FOR TRIMMING SPRINKLER HEADS

CROSS-REFERENCE TO RELATED APPLICATIONS

This application claims priority to U.S. Provisional Application Ser. No. 62/976,345 filed on Feb. 13, 2020, the contents of which are hereby incorporated in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a lawn edger having a head for trimming a lawn in a circular pattern. More particularly, the invention relates to a removable lawn edger head having an annular cutting edge.

Description of the Related Art

Trimming and edging around lawn sprinkler heads is typically a time-consuming and tedious task. Grass surrounding a sprinkler head may grow over the sprinkler head and impede operation. Frequent edging is required to provide a landscaped appearance and to permit sprinklers to operate properly.

Landscapers conventionally perform such edging either manually using conventional motorized grass trimming devices. Manual edging is extremely tedious, inefficient and impractical when a large number of sprinkler heads are involved, such as on a golf course. A golf course may have 800 to 1000 sprinkler heads. Concomitantly, golf courses place a premium on aesthetics and carefully manicured greens. Manual cutting is not conducive to a uniform, precise, repeatable and aesthetically pleasing cut.

While more efficient than scissors, conventional motorized trimmers that use a spinning cord are not conducive to a uniform, precise and aesthetically pleasing cut. Often they result in a noticeably uneven cut due to bouncing of the cutting device off the surface of the ground. Additionally, such trimmers must be manipulated around the entire periphery of the sprinkler head, still making the job quite tedious. Furthermore, the cutting cords of such trimmers frequently break, especially after repeated contact with sprinkler heads, incurring additional time and cost for replacement. Moreover, such devices have a tendency to damage yardage markers commonly placed on sprinkler heads in golf courses and mar the contacted surfaces of the sprinkler heads.

While motorized rotary cutters have been developed for edging around sprinkler heads, these devices typically have a poor and unbalanced construction that does not adequately protect the sprinkler head. Though quicker and more efficient than scissors and conventional motorized trimmers, such devices still suffer many shortcomings. They tend to break easily, bounce upon contacting the sprinkler head, produce an off-centered non-uniform cut, damage yardage markers on sprinkler heads and mar the contacted surfaces of the sprinkler heads.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

In view of the foregoing, it is desirable to provide a device to produce a centered, uniform, repeatable cut for edging around sprinkler heads, without marring or damaging the sprinkler heads or yardage markers on them.

BRIEF SUMMARY OF THE INVENTION

Disclosed is an annular lawn edger having an elongate pole housing a motor, a handle including a grip, a removable battery, and a trigger for actuating the motor. The lawn edger of the invention includes adapter at a distal end of the pole configured to impart rotational motion to a lawn edging head attached to the adapter. The lawn edging head has the general form of a hole saw. The hole saw edging head has a body formed from a cylinder having an attachment disk at a proximal end, an annular cutting edge along the distal end of the cylinder. An attachment mechanism removably attaches the edging head to the adapter The edging head attachment mechanism is attached to the adapter by pressing it in a proximal direction against the adapter in the attachment mechanism is released from the adapter by the pressing a button on the adapter.

It is therefore an object of the present invention to provide an annular lawn edger that creates a uniform circle in the lawn. No more getting on your hands and knees to pullout grass from your sprinkler heads.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7 is a perspective and bottom view of an annular lawn edger head in accordance with the principles of the invention;

FIG. 8 is a perspective and bottom view of an annular lawn edger head in accordance with the principles of the invention;

FIG. 9 is a perspective and bottom view of an annular lawn edger head in accordance with the principles of the invention;

FIG. 10 is a top perspective view of a lawn trimmer attachment for trimming sprinkler heads in accordance with principles of the invention;

DETAILED DESCRIPTION

Figure 1:
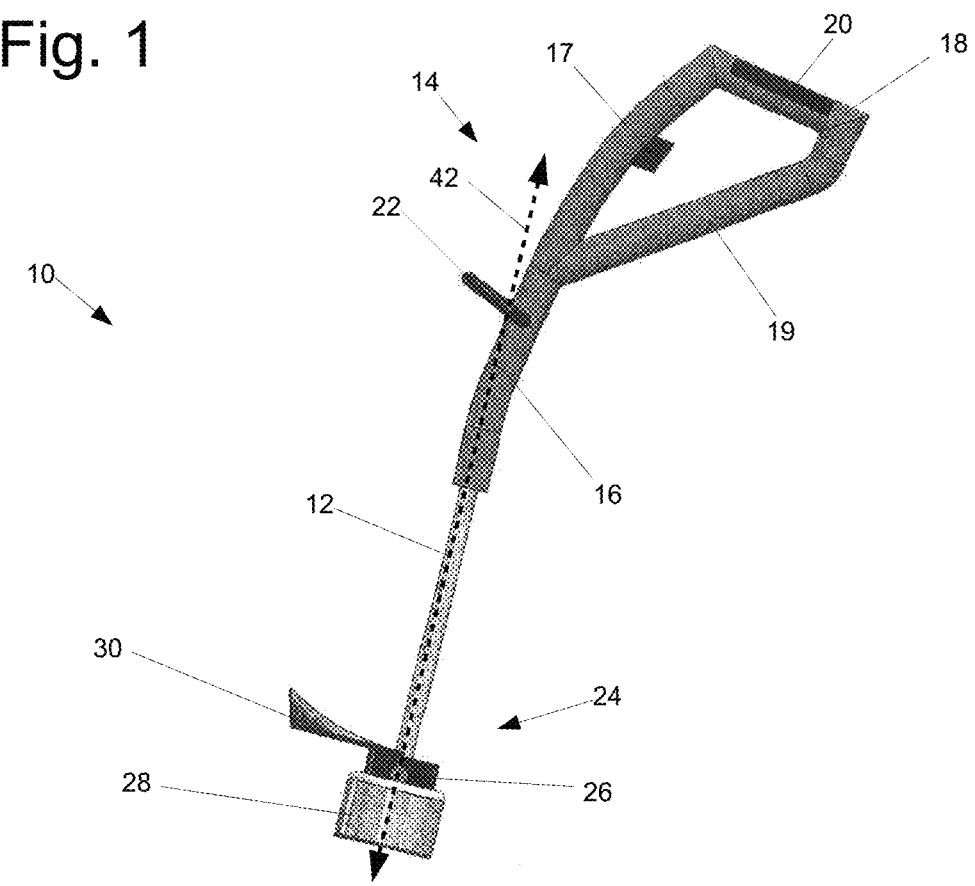
FIG. 1 is a side view of an annular lawn edger in accordance with the principles of the invention.
Figure 2:
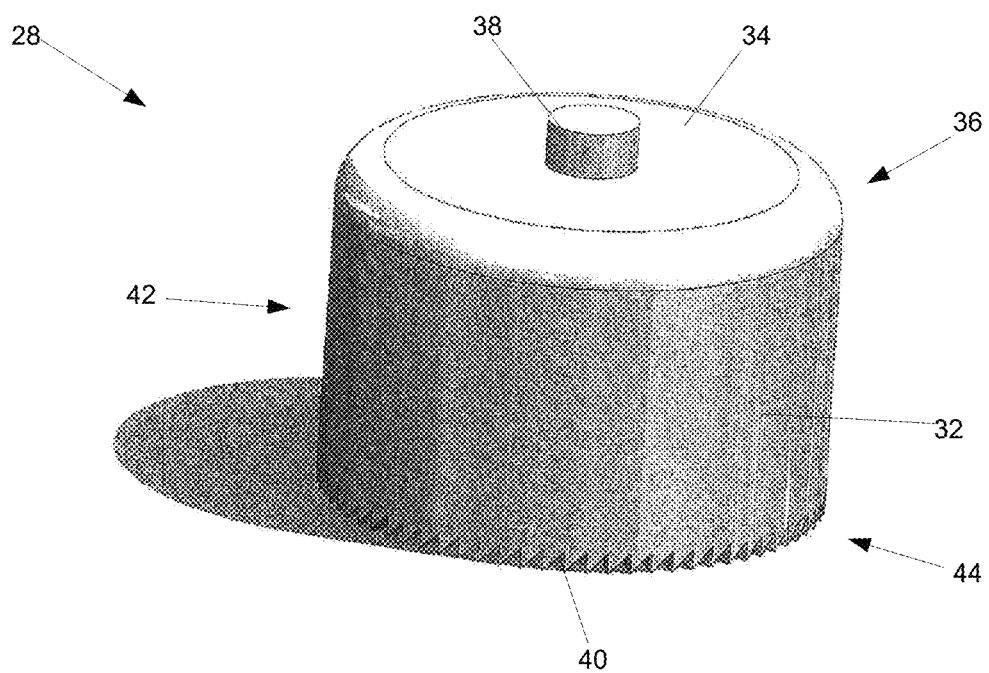
FIG. 2 is a perspective view of an annular lawn edger head in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein. Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Unless otherwise indicated, all numbers expressing quantities of ingredients, dimensions, reaction conditions and so forth used in the specification and claims are to be understood as being modified in all instances by the term "about". The term "a" or "an" as used herein means "at least one" unless specified otherwise. In this specification and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise. Furthermore, "proximal" generally refers to the direction toward the operator of the device and "distal" generally refers to the direction away from the operator of the device.

In describing the lawn trimmer attachment for trimming sprinkler heads, the term "longitudinal" is used to describe the length of the elongate body, and "transverse" refers to a direction perpendicular to the longitudinal direction of the elongate body. "Top" and "upward" refer to side of the attachment that attaches to a lawn trimmer's rotating head. "Bottom" and "downward" refer to the direction opposite to the "top." "Lateral" generally refers to the sides parallel to the longitudinal direction and "distal" refers to the ends of the longitudinal length of the elongate body.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

Figure 3:
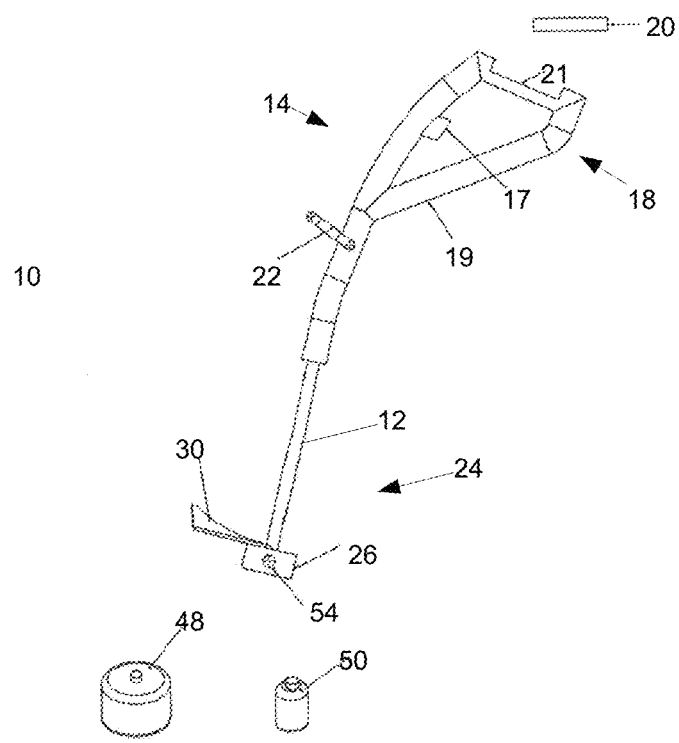
FIG. 3 is another side view of an annular lawn edger in accordance with the principles of the invention.
Figure 4:
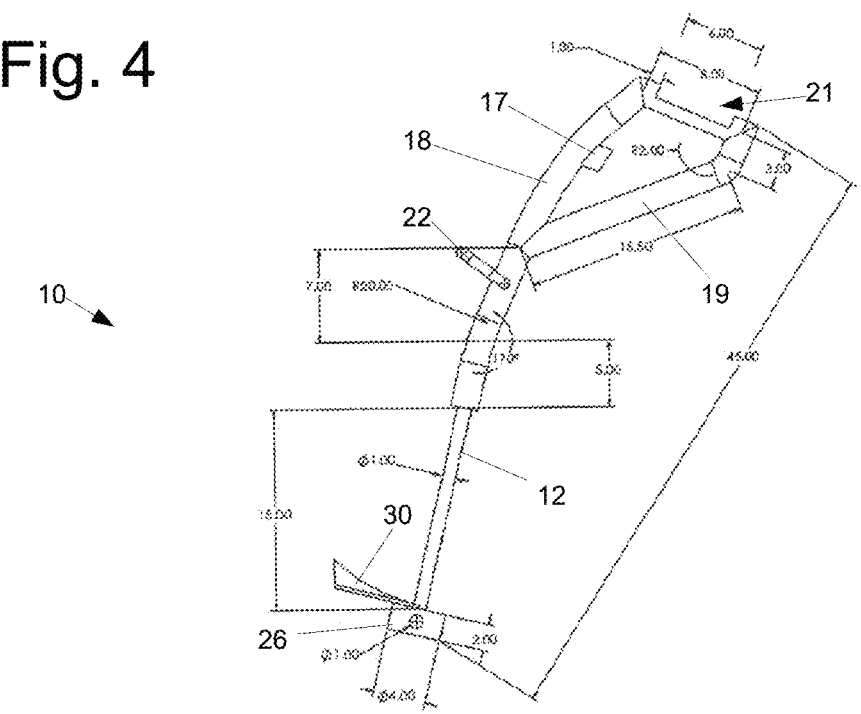
FIG. 4 is another side view of an annular lawn edger showing exemplary dimensions in accordance with the principles of the invention.
Figure 5:
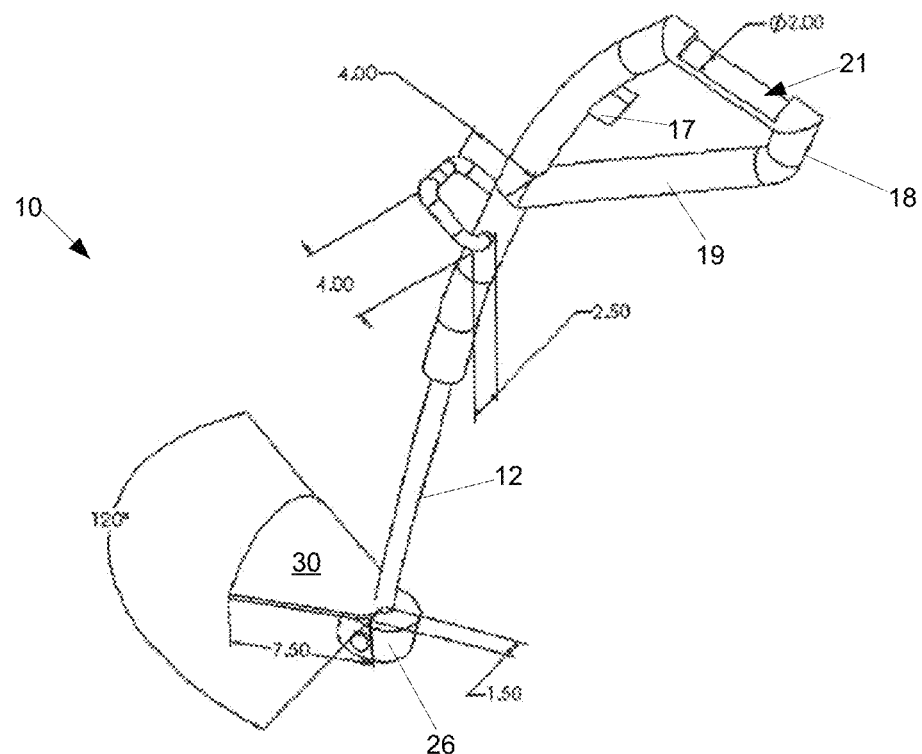
FIG. 5 is a perspective view of an annular lawn edger showing exemplary dimensions in accordance with the principles of the invention.

FIGS. 1-6 show an annular lawn edger 10 in accordance with principles of the invention. The annular lawn edger 10 includes an elongate pole 12 housing an internal electric motor, not shown. The proximal end 14 of the pole 12 has a handle 16 including a grip 18 which houses a rechargeable battery 20. Batter 20 is optionally removable from a slot 21 and a trigger 17. FIGS. 3-5 show the handle 16 with the battery removed from battery slot 21. In this embodiment, the handle 16 includes a diagonal strut 19 lending support to the handle 16 and pole 12 and minimizing wobbling of the device during use. The handle 16 also includes an ancillary handle 22 so that the annular lawn edger 10 may be held by both hands of an operator, providing greater control over the device. At the distal end 24 of the edger 10 is an adapter 26 configured to removably attach an annular lawn edging head 28. The adapter 26 imparts rotational motion to the edging head 28, or any other edging head, attached to it. A grass guard 30 extends around at least a portion of the adapter 26.

The adapter 26 is in general configured to attach to a spool of lawn edger wire. The annular lawn edger 10 in accordance with the principles of the invention has an edging head 28 secured to the adapter 26. The annular lawn saw edging head 28 is shown in more detail in FIG. 2. The annular lawn edging head 28 has the general configuration of a hole saw, having a body 42 formed from a proximal disk 34 and a cylinder 32 extending in a distal direction from the disk 34. The proximal disk 34 extends over the proximal end 36 of the cylinder 32 and has an attachment mechanism 38 in its center configured to removably attached to the adapter 26. A cutting edge 40 extends along the annular distal end 44 of the cylinder 32. The lawn edging head 28 is made of a hard resin and/or plastic, such as for example high density polyethylene, high density polypropylene, polystyrene resin, polyurethane resin, epoxy resin, silicone resin, acrylic resin and/or polyester resin and the like.

In use, the attachment mechanism 38 is snapped into the adapter 26 by pressing it in a proximal direction. Once attached, the annular lawn edging head 28 rotates about an axis 42 defined by the pole 12 and extending through the center 44 of the cylinder 32. The annular lawn edger 10 is placed over a sprinkler or other circular object. The trigger is then depressed, actuating the motor which imparts torque to the annular lawn edging head. The annular lawn edging head rapidly and efficiently cuts a circular hole in vegetation surrounding the lawn sprinkler head. The annular lawn edger 10 may be used to cut a circular opening in vegetation about any other desired object as well. Optionally, an annular lawn edger 10 may be provided with a plurality of annular lawn edging heads having cutting edges of different diameters, allowing the device to accommodate different sprinkler head sizes.

Figure 6:
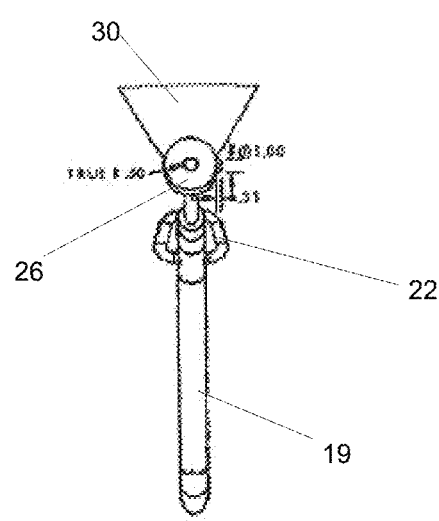
FIG. 6 is a bottom view of an annular lawn edger showing exemplary dimensions in accordance with the principles of the invention.
Figure 11:
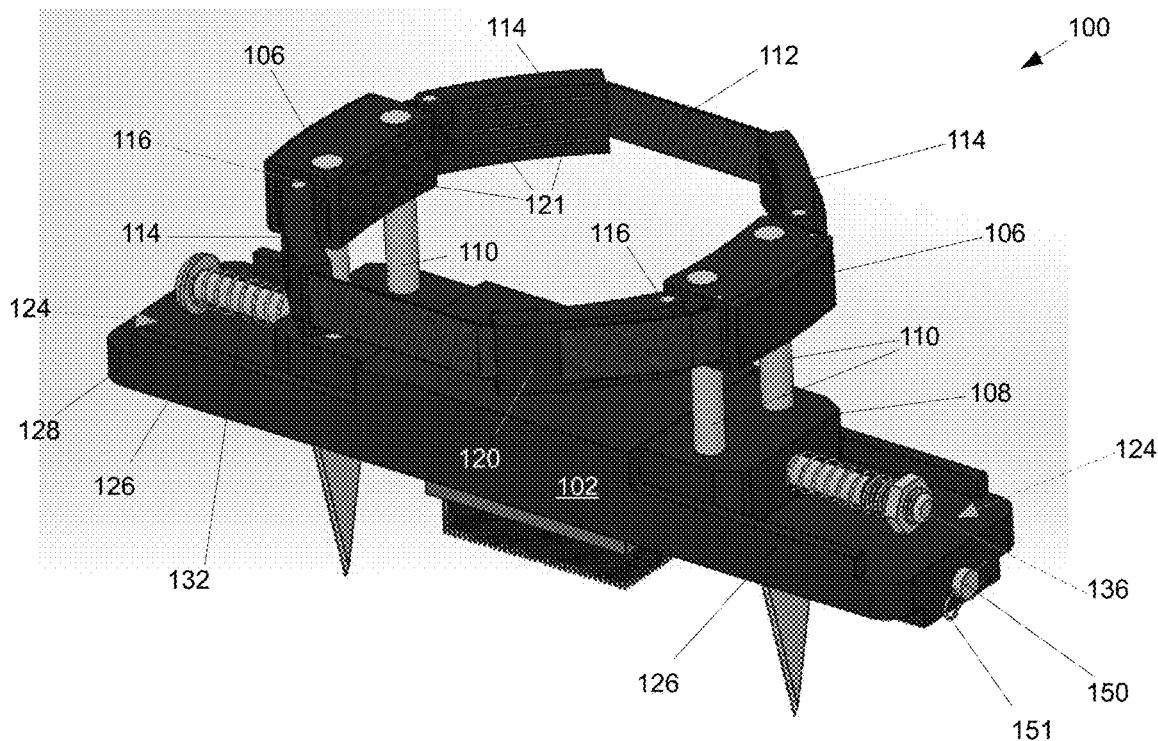
FIG. 11 is another top perspective view of a lawn trimmer attachment for trimming sprinkler heads in accordance with principles of the invention.
Figure 12:
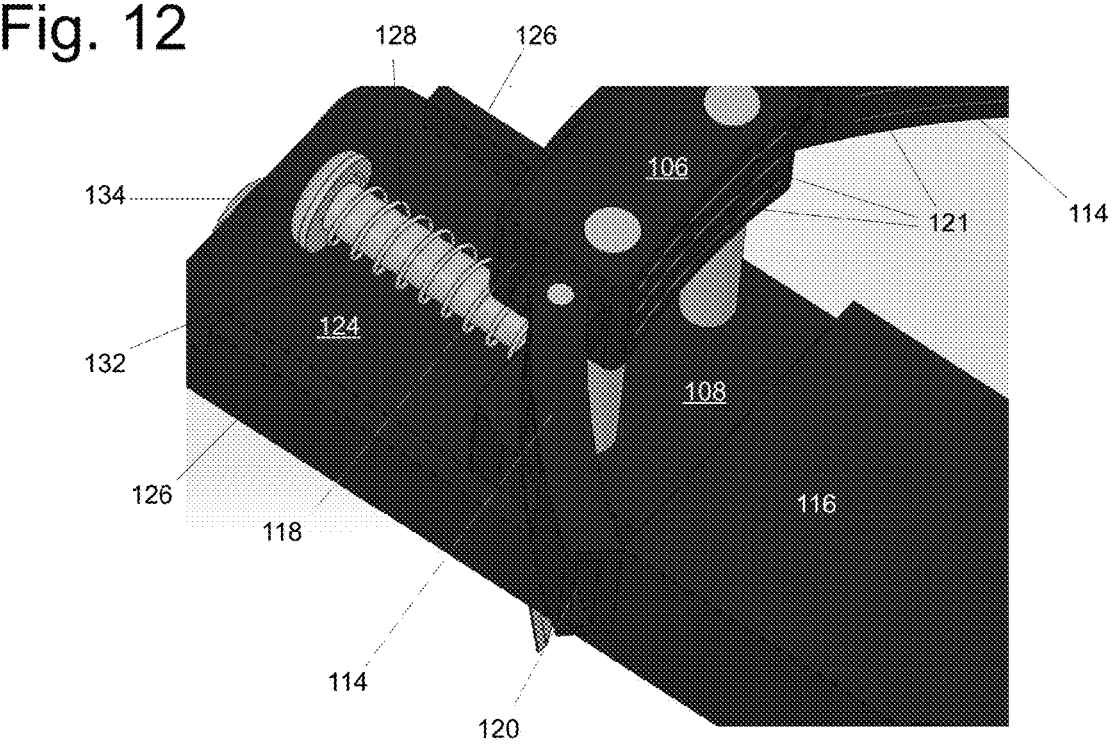
FIG. 12 is an enlarged top perspective view of a lawn trimmer attachment for trimming sprinkler heads in accordance with principles of the invention.
Figure 13:
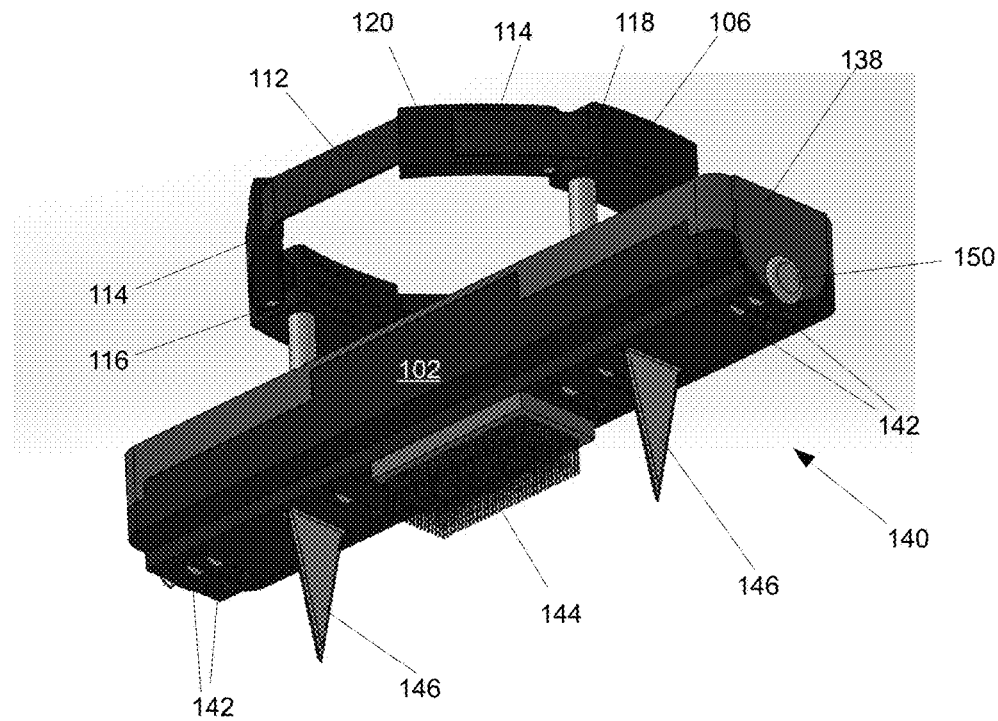
FIG. 13 is a bottom perspective view of a lawn trimmer attachment for trimming sprinkler heads in accordance with principles of the invention.
Figure 14:
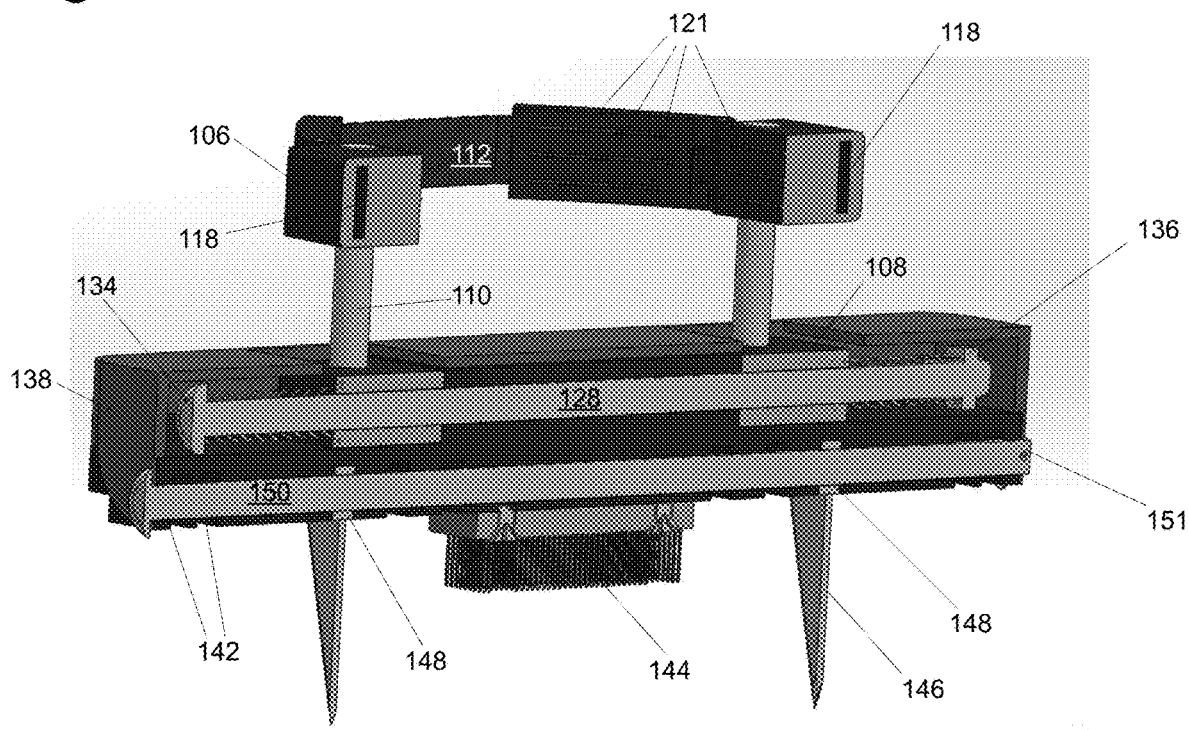
FIG. 14 is a cross-sectional view of a lawn trimmer attachment for trimming sprinkler heads in accordance with principles of the invention.
Figure 15:
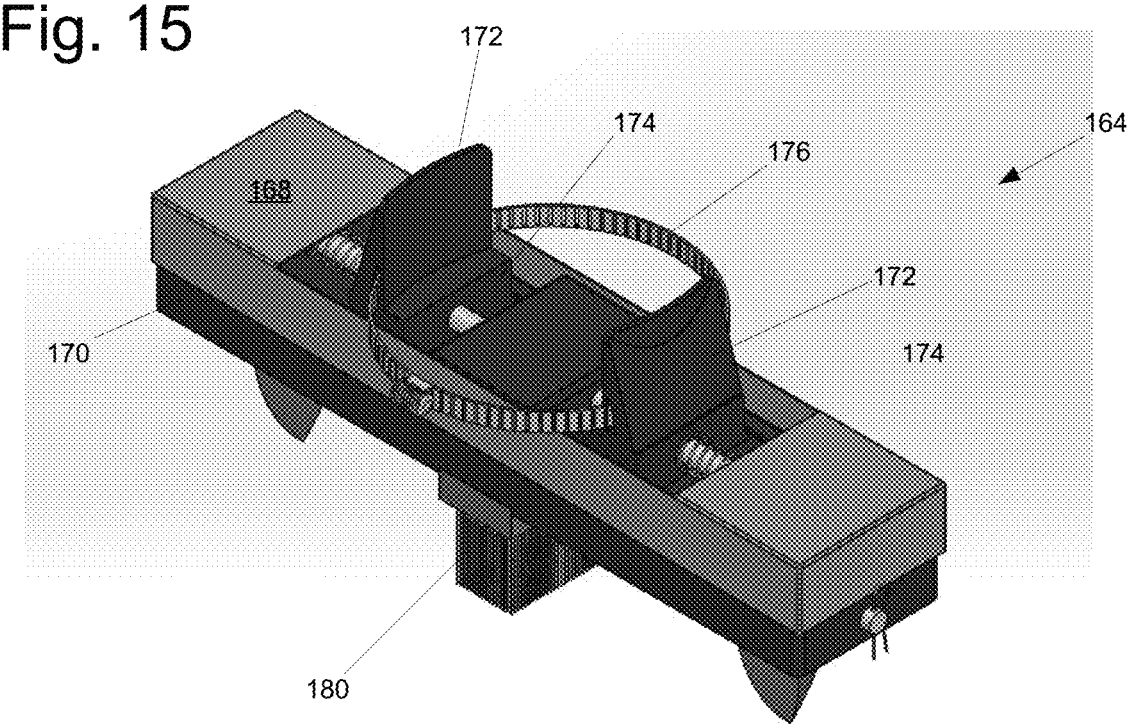
FIG. 15 is a top perspective view of an alternative embodiment of a lawn trimmer attachment for trimming sprinkler heads in accordance with principles of the invention.
Figure 16:
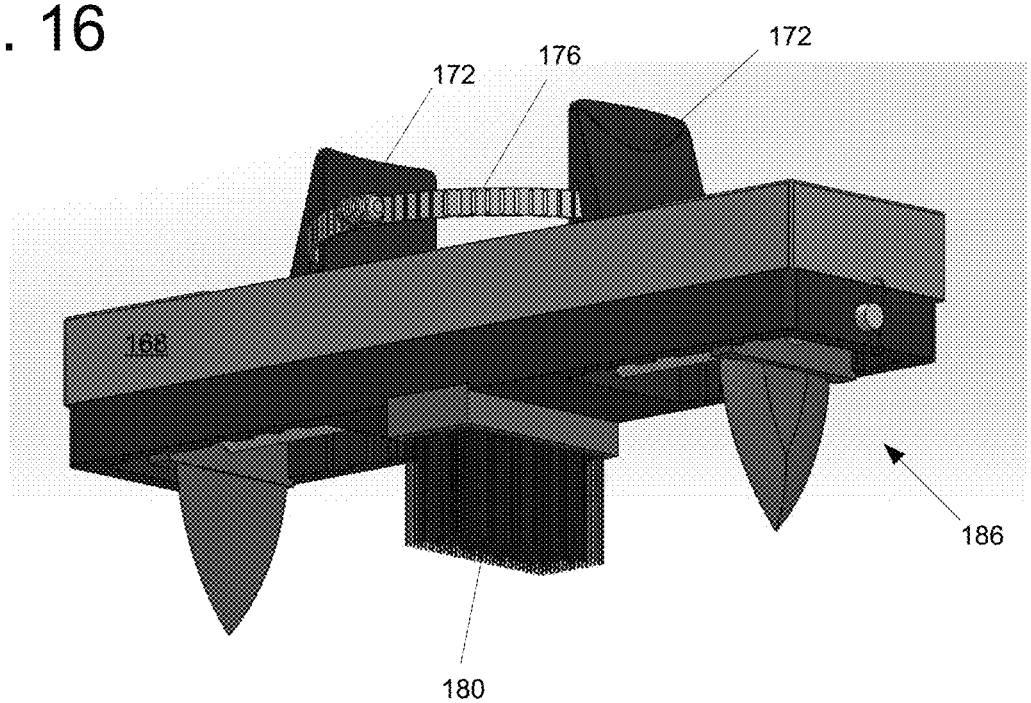
FIG. 16 is a side perspective view of an alternative embodiment of a lawn trimmer attachment for trimming sprinkler heads in accordance with principles of the invention.
Figure 17:
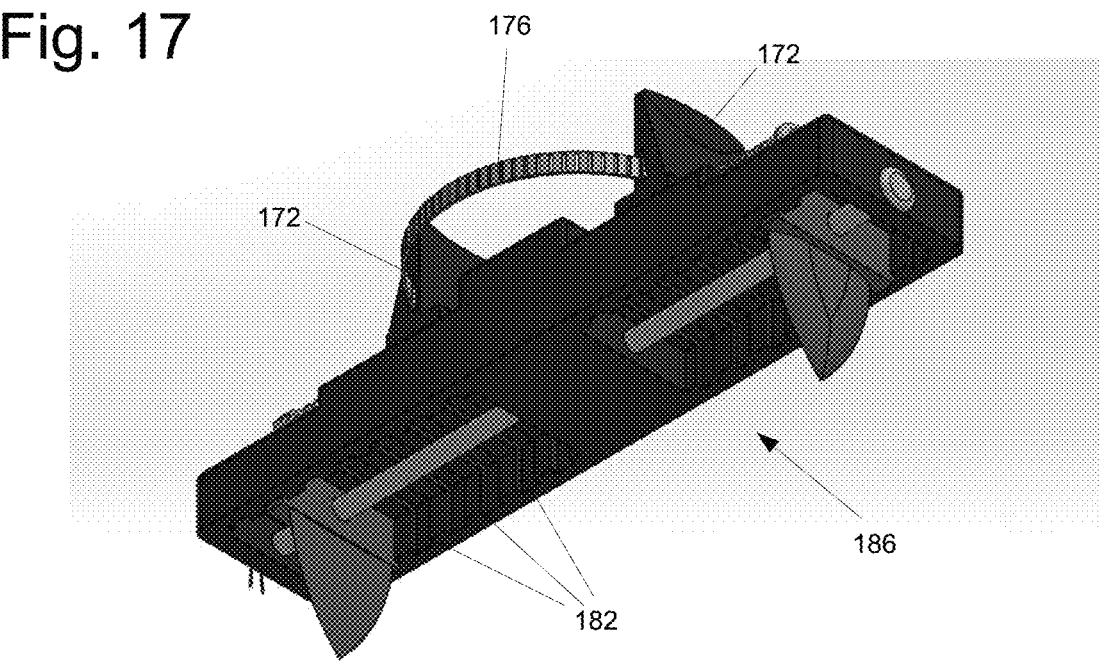
FIG. 17 is a bottom perspective view of an alternative embodiment of a lawn trimmer attachment for trimming sprinkler heads in accordance with principles of the invention.
Figure 18:
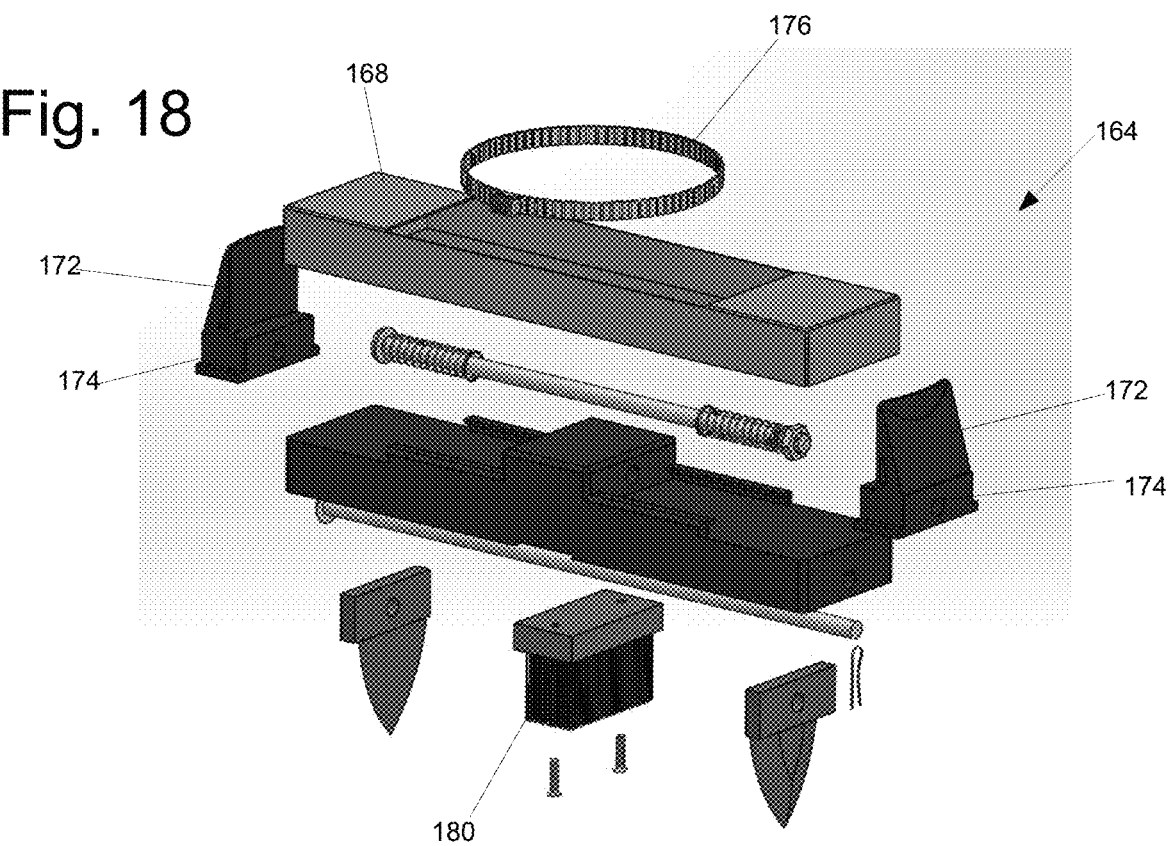
FIG. 18 is an exploded perspective view of an alternative embodiment of a lawn trimmer attachment for trimming sprinkler heads in accordance with principles of the invention.

FIG. 3 shows the annular lawn edger 10 having to separate hole saw edging heads 48 and 50 having diameters of 8.5 inches and 2.5 inches, respectively. As shown in FIGS. 3 and 4, the adapter 26 preferably includes a spring biased quick release button 54. When an edging head is snapped into the adapter, it is held in place by a spring biased locking tab. The release button 54 is biased by the same spring as the locking tab, and when depressed pushes the locking out of place to allow the edging head to be removed. Optionally, the adapter may include a spring bias applied to the attachment mechanism of the head such that when the quick release button 54 is depressed, the edging head is pushed out of the adapter. FIGS. 4-6 show exemplary dimensions of an annular lawn edger in accordance with the principles of the invention.

FIGS. 7-9 show exemplary dimensions for two annular lawn edging heads of different size in accordance with the principles of the invention. Annular lawn edging head 60 has a proximal disk 62 and an attachment mechanism 63 at its center. a cylindrical body 64 extending in a distal direction from the edge 68 of the disk 62. The distal end of the annular lawn edging head 60 has a cutting edge 70. Annular lawn edging head 72 has a hemispherical top 74 with an attachment mechanism 75 at its center. The cylindrical body 76 extends in a distal direction from the edge 78 of the hemispherical top 74. The distal end of the annular lawn edging head 72 has a cutting edge 80. A hemispherical top 74 distributes stress on the head more evenly, thus preventing vertical flexion, which may be encountered when the proximal end of the annular lawn edging head is a planar disk. A hemispherical top may also prevent wobbling of the annular lawn edging head. Optionally, the hemispherical top may be constructed of fairly flexible material. This allows a user to tilt the edging head in order to cut deeper and/or with more force on a particular point around the circular object being trimmed. Annular lawn edging heads 60

In one embodiment, the adapter is a socket designed to house a spool of cutting cord and has an end cap covering the spool. The attachment mechanism is configured to attach to the socket when the end cap and cutting cord spool are removed. This allows the annular lawn edger of the invention to be used with almost any existing motorized trimmer.

In an alternative embodiment, the attachment mechanism is cylindrical and includes a tapered flange at its top. The flange may be continuous or comprised of a plurality of discrete teeth. The angled upper surface of the flange allows the annular lawn edging head to snap past one or more spring biased tabs and into a socket. The spring biased tabs impinge on the lower portion of the attachment mechanism. To release the annular lawn edger, a button on the exterior of the adapter is depressed. When the button is depressed, the tabs are retracted, allowing the flange to pass over them.

FIGS. 10-14 show another alternative embodiment of a lawn trimmer attachment for trimming sprinkler heads 100 in accordance with principles of the invention. The attachment 100 is configured to be fit over an existing rotating flexible line weed eater head. The lawn trimmer attachment 100 has an elongate body 102 extending along a longitudinal direction 101 between two distal ends 103. In this embodiment, the body has a configuration of a rectangular prism. Those skilled in the art will appreciate that any attachment to a rotating head will preferably have a center of mass at its center 104.

Two opposing trimmer head clamps 106 extend upward from the elongate body 102 in an upward direction. In this embodiment, each of the trimmer head clamps 106 is connected to a head clamp carriage 108 by rigid posts 110. Optionally, the head clamps 106 may be vertically adjustable by adjusting their attachment to the rigid posts 110 or otherwise. Optionally, only a single post or three or more posts may be used to attach the clamp 106 to the carriage 108.

An adjustable circular tension strap 112 extends between the two opposing head clamps 106, and may be elastomeric and/or have an adjustable length. In this embodiment, the tension strap is releasably and adjustably connected to itself using Velcro® strips. Each of the head clamp carriages 108 is spring biased toward the center 104 of the attachment 100. In use, a typical weed eater head is positioned between the head clamps 106 which impinge upon and frictionally engage the sides of the weed eater head. Because weed eater heads typically utilize a high angular velocity, the circular tension strap 112 is used to tighten the grip of the head clamps 106 and provide additional frictional intention engagement with the weed eater head in order to transfer the head's angular velocity to the attachment 100.

In this embodiment, each of the opposing head clamps 106 includes two lateral rectangular arms 114 attached by lateral hinges 116. Lateral hinges 116 may optionally be biased. The two transverse rectangular arms 114 of each had to clamp 106 extend in opposing transverse directions from the head clamps 106. The adjustable circular tension strap is threaded through strap guides 118 on the head clamps 106 and strap guides 120 on the lateral arms 114. The head clamps 106 and the lateral arms 114 may also include one or more pads or strips 121 of highly frictional material such as rubber or other material known to create a grip. These pads or strips 120 also assist in forming a tight friction fit with a lawn trimmer head.

The head clamp carriages 108 are located within opposing longitudinal tracks 124. In this embodiment, each track 124 is defined by two lateral longitudinal sidewalls 126. A longitudinal central bolt 128 extends longitudinally through each longitudinal track 124 and through the carriages 108. In this embodiment, a single longitudinal bolt 128 extends through both opposing tracks 124. Each of the opposing tracks 124 includes a spring 132 anchored to an anchor 134 at the distal end of the bolt 128. Each spring 132 impinges upon one of the carriages 108, thereby providing a spring biased in the carriage 108 and a longitudinal direction and toward the center 104. In this embodiment, one of the anchors 134 comprises a nut 136 screwed onto the end of the longitudinal bolt 128. This allows the bias created by the springs 132 on each of the carriages 108 to be adjusted by rotating the nut 136. The nut 136 may be completely unscrewed from the bolt 128 in order to disassemble the entire attachment 100 for cleaning or other purposes. During normal use and when fully assembled, a track cover 138 is attached to the top of the elongate body 102 to substantially cover the longitudinal tracks 124, thereby preventing debris from clogging the tracks and/or interfering with the springs 132 or otherwise increasing wear on the device.

The bottom 140 of the elongate body 102 includes a plurality of longitudinally spaced blade sockets 142 extending distally in both directions from a central brush 144. In this embodiment, the blade sockets 142 are rectangular, and the central brush 144 extends further in the longitudinal direction than the transverse direction. The central brush 144 may optionally be interchangeable with brushes of different sizes, shapes, texture and/or strength. A pair of opposing transverse blades 146 are spaced equidistant only from the center 104 in opposing sockets 142. To preserve a center of gravity at the center 104, the transverse blades 146 are spaced equidistant me from the center 104. Each of the transverse blades 146 includes a blade base 148 which is inserted into the socket 142. A longitudinal bolt 150 extends through the sockets 142 and through the blade bases 148. To reposition the transverse blades 146, the longitudinal bolt 150 is removed, the transverse blades 146 are then relocated to a desired pair of Blade sockets 142, and the longitudinal bolt 150 is reinserted. In this embodiment, the longitudinal bolt 150 is secured in place by a cotter pin 151. Those skilled in the art will appreciate that there are other mechanisms for removably securing blades in various sockets of different distance from the center of the attachment.

In use, the trimmer attachment 100 is positioned so that the head clamps 106 rest against opposite sides of the head of a typical lawn trimmer. The tension strap 112 may be adjusted to tighten the attachments grip on the lawn trimmer head. The transverse blades 146 are positioned in the desired blade sockets 142 so that the distance between the opposing transverse blades 146 is slightly larger than the diameter of a sprinkler head. The opposing transverse blades 146 are then secured in the appropriate sockets 142 using a longitudinal bolt 150 or other mechanism. An operator then actuates the lawn trimmer and places it over a sprinkler head to be trimmed. The attachment 100 rotates with the trimmer head, causing the transverse blades 146 to trim vegetation growing over the sprinkler head. The central brush 144 brushes cut vegetation and any other debris from the top of the sprinkler head.

FIGS. 15-18 show an alternative embodiment of a lawn trimmer attachment 164 trimming a sprinkler head in accordance with principles of the invention. In this embodiment, there is a single cover 168 over the top of the elongate body 170. The head clamps 172 are attached directly to the carriages 174, and are not separated by posts. The head clamps 172 also do not include lateral arms or high friction strips or pads. The tension strap 176 is a worm gear hose clamp and is not elastic like the tension strap 112 in the previous embodiment. In addition, the bottom brush 180 is elongate in a transverse direction rather than a longitudinal direction like the central brush 144 in the previous embodiment. In addition, the blade sockets 182 are transverse channels in an open bottom 186 of the elongate body 170.

Figure 19:
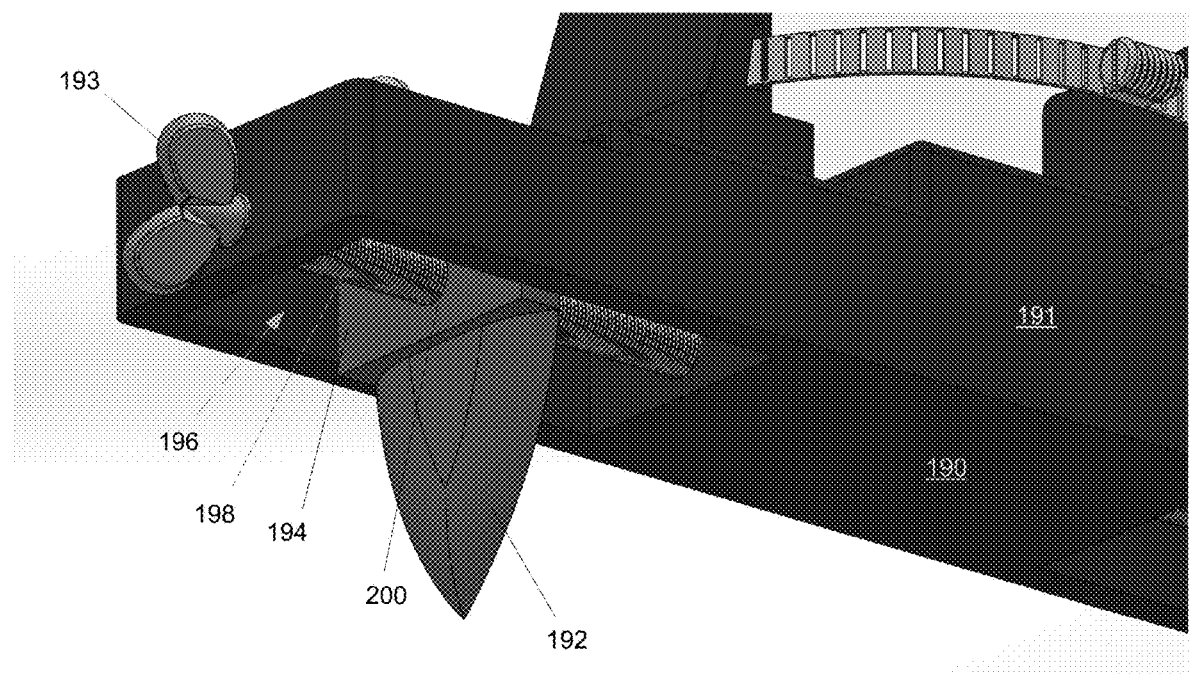
FIG. 19 is a perspective view of another alternative embodiment of a lawn trimmer attachment for trimming sprinkler heads in accordance with principles of the invention.

FIG. 19 shows an alternative embodiment of a bottom 190 an elongate body 191 in accordance with principles of the invention. In this embodiment, the transverse blade 192 has a rectangular base 194 slidably engaged within a blade channel 196. A threaded bolt 198 extends through the blade channel 196 and a threaded hole 200 in the base 194 of the transverse blade 192. The distal end 193 of the threaded bolt 198 extends out of the elongate body 191 and has a thumbscrew configuration. The position of the transverse blade is adjusted by turning the threaded bolt 198.

Figure 20:
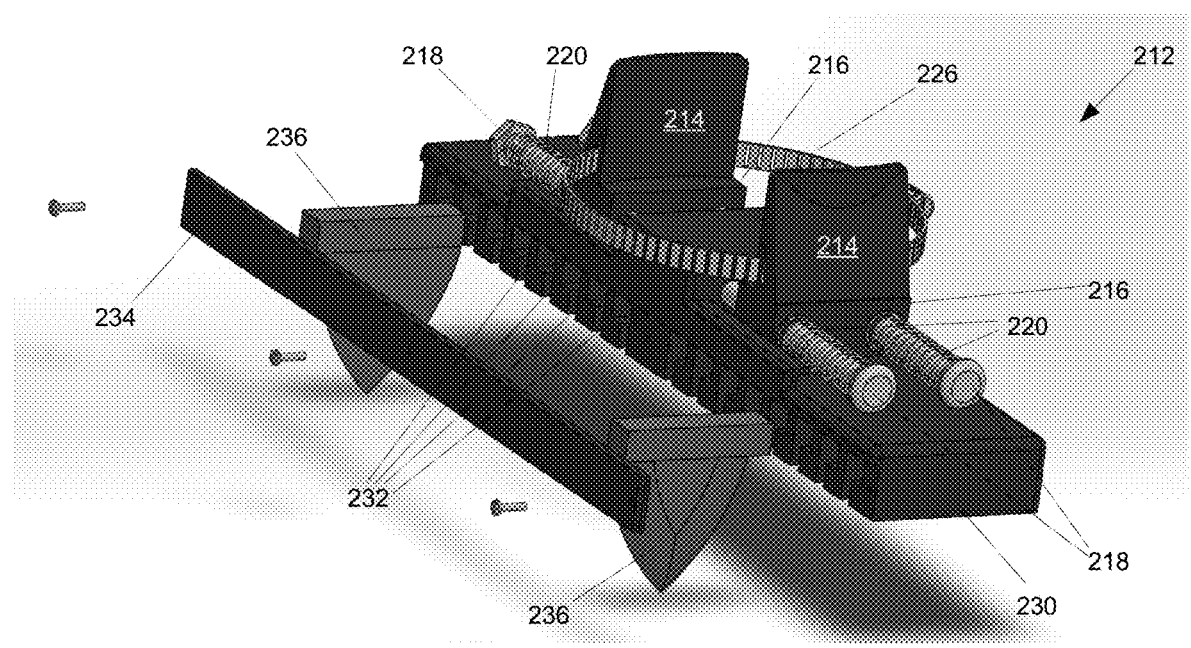
FIG. 20 is a partially exploded view of another alternative embodiment of a lawn trimmer attachment for trimming sprinkler heads in accordance with principles of the invention.

FIG. 20 shows another alternative embodiment of a lawn trimmer head attachment 212 four trimming a sprinkler in accordance with principles of the invention. In this embodiment, the head clamps 214 are directly attached to the clamp carriages 216. In this embodiment, two parallel longitudinal bolts 218 extend through each of the carriages 216, each of which have biasing springs 220 anchored at the distal ends of the longitudinal bolts 218 and bias the head clamps 214 toward the center of the attachment 212. The tension strap 226 of this embodiment is also a worm gear hose clamp. The bottom 230 of the attachment 212 has a plurality of longitudinally spaced transverse blade sockets 232 having a T shaped cross-section. A removable lateral sidewall 234 may be removed in order to remove the transverse blades 236 so they may be repositioned in different blade sockets 232. The lateral sidewall 234 is then replaced, securing the transverse blades 236 in place.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A lawn trimmer attachment for trimming sprinkler heads comprising:
   an elongate body;
   two opposing trimmer head clamps on a top of the elongate body;
   an adjustable tension strap extending between the two opposing trimmer head clamps;

a plurality of blade sockets along a longitudinal direction on a bottom of the elongate body;

two opposing blades, each of the blades having a base secured within one of the plurality of blade sockets, and extending downward from the bottom of the elongate body;

a brush extending downward from the center of the elongate body; and, wherein the two opposing blades are oriented transversely to the elongate body and equidistant from a center of the elongate body; and, wherein each of the opposing trimmer head clamps is spring biased toward the center of the elongate body.

2. The lawn trimmer attachment for trimming sprinkler heads of claim 1 wherein each of the opposing trimmer head clamps has two opposing lateral arms and one or more gripping panels facing toward the center of the elongate body.

3. The lawn trimmer attachment for trimming sprinkler heads of claim 2 wherein each of the opposing trimmer head clamps comprises a carriage capable of sliding longitudinally along a track in the elongate body.

4. The lawn trimmer attachment for trimming sprinkler heads of claim 3 wherein a central stabilizing bolt extends between two opposing ends through a central bore in each of the carriages of the opposing trimmer head clamps, and the spring bias of the opposing trimmer head clamps is provided by opposing springs, each extending from one of the opposing trimmer head clamps to one of the ends of the stabilizing bolt to which it is anchored.

5. The lawn trimmer attachment for trimming sprinkler heads of claim 4 wherein the opposing transverse blades are secured within the blade sockets by a longitudinal bolt extending through longitudinal openings in the bases of the blades.

6. A lawn trimmer attachment for trimming sprinkler heads comprising:

an elongate body extending in and a longitudinal direction between two ends;

two opposing trimmer head clamps on a top of the elongate body;

an adjustable tension strap extending between the two opposing trimmer head clamps;

two opposing blade tracks, each extending in the longitudinal direction from one of the two ends toward a center of the elongate body, each blade track having a central threaded longitudinal rotatable bolt;

two opposing blades extending downward from the bottom of the elongate body, each of the blades having a base secured within one of the opposing blade tracks, and a longitudinal opening extending through the base;

wherein the two opposing blades are oriented transversely to the elongate body; and, wherein positions of each of the two opposing blades may be adjusted longitudinally by rotating the central threaded longitudinal rotatable bolts.

7. The lawn trimmer attachment for trimming sprinkler heads of claim 6 further comprising a brush extending downward from the center of the elongate body.

* * * * *